(12) United States Patent
Weakley

(10) Patent No.: US 7,175,517 B1
(45) Date of Patent: Feb. 13, 2007

(54) SEMI-BONELESS POULTRY PRODUCT

(75) Inventor: David F. Weakley, Elkton, VA (US)

(73) Assignee: Perdue Holdings, Inc., Wilmington, DE (US)

(*) Notice: Subject to any disclaimer, the term of this patent is extended or adjusted under 35 U.S.C. 154(b) by 57 days.

(21) Appl. No.: 10/625,775

(22) Filed: Jul. 24, 2003

(51) Int. Cl.
*A22C 18/00* (2006.01)

(52) U.S. Cl. ..................................................... 452/149
(58) Field of Classification Search ............... 452/149, 452/198
See application file for complete search history.

(56) References Cited

U.S. PATENT DOCUMENTS

| | | | | | |
|---|---|---|---|---|---|
| 3,036,922 | A | * | 5/1962 | Saverslak | 426/274 |
| 4,285,980 | A | * | 8/1981 | Lewis | 426/249 |
| 4,517,207 | A | * | 5/1985 | Kress | 426/315 |
| 5,088,957 | A | | 2/1992 | Gagliardi, Jr. | |
| 5,195,924 | A | | 3/1993 | Gagliardi, Jr. | |
| 5,368,519 | A | * | 11/1994 | Curtis et al. | 452/135 |
| 5,779,532 | A | | 7/1998 | Gagliardi, Jr. | |
| 5,932,278 | A | * | 8/1999 | Gagliardi, Jr. | 426/644 |
| 6,238,281 | B1 | * | 5/2001 | Gagliardi, Jr. | 452/135 |
| 6,277,020 | B1 | | 8/2001 | Stephens | |
| 6,282,869 | B1 | * | 9/2001 | Bullock et al. | 53/434 |
| 6,319,110 | B1 | | 11/2001 | Peters et al. | |
| 6,428,838 | B1 | * | 8/2002 | Gagliardi, Jr. | 426/644 |

FOREIGN PATENT DOCUMENTS

EP 0695506 A2 2/1996

OTHER PUBLICATIONS

U.S. Appl. No. 10/625,775, filed, Jul. 24, 2003, Pending.
U.S. Appl. No. 10/448,353, filed, May 30, 2003, Pending.
U.S. Appl. No. 10/633,679, filed, Aug. 5, 2003, Pending.
U.S. Appl. No. 10/721,229, filed, Nov. 26, 2003, Pending.
Turko Packing, Inc. Brochure: "The Original Whole Boneless Specialty Turkey."

* cited by examiner

*Primary Examiner*—Thomas Price
(74) *Attorney, Agent, or Firm*—RatnerPrestia

(57) ABSTRACT

The present invention relates to a semi-boneless poultry product and a method of making thereof wherein bones of a poultry carcass are removed and the remaining meat portion of the carcass forms an integral butchered cut that can be stitched closed and trussed, wrapped or netted to appear as a whole poultry carcass. The poultry product prepared in this way retains the aesthetic appearance of a whole poultry carcass, but is more easily prepared and served.

11 Claims, 13 Drawing Sheets

SEMI-BONELESS POULTRY PRODUCT

BACKGROUND OF THE INVENTION

1. Field of the Invention

The invention relates generally to a method of butchering a poultry carcass and to a prepared poultry product, and more particularly, to a semi-boneless poultry product. The invention is directed to the semi-boneless poultry product as well as to methods of making and methods of using the semi-boneless poultry product. The butchered product according to the invention is more easily cooked and served while maintaining the aesthetically pleasing appearance of a fully boned poultry product.

In addition to maximizing the aesthetic appeal, and ease of use, the semi-boneless poultry product according to the invention has certain economic benefits. Consumer tastes have become more sophisticated and the butchering methods must be altered to suit market demand. Consumers are now demanding new and different ways of purchasing and preparing poultry meat products. In addition, consumers are willing to pay a premium for poultry products which are interesting and convenient for their purposes, such as semi-boneless meat products.

The invention involves a procedure for use in deboning poultry that comprises situating the prepared poultry carcass upon a mount, such as a cone or other placement stabilizer. The situated carcass provides cutting axes for removing the interior bones and wings while preserving the skin and leg bones intact along with the meat to form a prepared poultry product that appears similar to a whole bird for cooking, but is more easily prepared and served. While whole-bird roasters and prepared poultry cuts are both well-known, they each present different challenges to the end-user.

After cooking, whole bird roasters have an aesthetically pleasing appearance and can form the centerpiece in the presentation of a meal. This is particularly appealing for meals served in a group setting. Thus the full-boned roasting bird has aesthetic uses for both private functions and in a commercially administered setting. However, the fully-boned whole bird meat product presents difficulties to the server that requires specialized skills in carving the cooked meat from the bones of the fully boned roaster. Once carved, the fully boned roaster also produces a considerable amount of bone and scrap debris which must be disposed of by the end-user after the meal is served.

Prepared cuts of poultry meat overcome some of these difficulties in that the poultry meat is partially or wholly separated from the bones of the poultry carcass before cooking. However, these prepared cuts of poultry meat lose at least some of the aesthetic appeal to be had in the presentation of a fully boned roaster. Also, for highly tender or succulent meat servings, longer and slower cooking times are generally required with larger cuts of meat. Prepared cuts of poultry meat lose part of this capability as they form smaller cooking portions relative to a full sized and whole bird.

The semi-boneless bird is deboned and trussed or netted in a manner to have the look of a fully bone-in bird. The semi-boneless poultry product can provide all the normal meat yield to the consumer, but with enhanced convenience as it is easy to carve and has minimal bones, while maintaining the appearance and aesthetic appeal of a fully bone-in product. This is important to private individuals as well as to many food service providers and retail food purveyors in various industries.

The costs involved in obtaining, feeding, raising, and bringing to market an edible animal, such as a chicken continue to rise. Due to the increase in costs and, assuming that only reasonable increases may be made in the market price charged to the consumer for meat products without adversely affecting consumer demand, it has become increasingly important to more skillfully butcher animal carcasses in order to maximize the total meat yield in forms which are more desirable to consumers and, consequently, more profitable for food providers. In addition to maximizing the total meat yield from animal carcasses, consumers are now demanding new and different ways of purchasing and preparing meat products. In addition, consumers are willing to pay a premium for meat products which are interesting and convenient for their needs, such as boneless meat products.

2. Discussion of the Background

Methods and apparatuses for butchering or otherwise obtaining the meat from poultry are well-known in the art. In view of the increasing demand for such new, innovative products as boneless breasts, tenders, etc., for both the commercial food market and for home use, methods for more easily obtaining increased amounts of meat from poultry carcasses in shorter time periods have become increasingly more desirable. However, the prior art methods have not proven to be entirely satisfactory in meeting these needs. Some of the prior art methods have proven to be inadequate in removing all of the desired meat from the poultry carcass, thereby resulting in increased waste of the poultry meat. For instance, U.S. Pat. No. 5,779,532, describes a method of obtaining a butchered meat product from the ribs of a chicken. U.S. Pat. No. 5,195,924 is directed to a method of slaughtering an animal to produce a prepared meat product in which only a small percentage of the meat is actually retained. U.S. Pat. No. 5,088,957 describes a method of butchering poultry to provide a wishbone cut that only utilized the breast portion of the bird. European Patent Publication No. EP 0 695 506 describes an automated process for removing an inner fillet from slaughtered poultry.

Other prior art methods for deboning poultry have been developed, but have only been successful in removing the bones from the meat and do not retain a complete carcass for an aesthetically appealing presentation. U.S. Pat. No. 6,319,110 describes an automated process wherein the carcass hangs as it passes through the cutting operation. U.S. Pat. No. 6,277,020 describes a process for deboning chicken which is partially automated. All documents cited herein are incorporated by reference for all purposes.

The present inventors have successfully developed a slaughtered poultry product and method of slaughtering poultry in which substantially all the meat of a whole carcass is removed in one unitary integrated meat portion. The meat product according to the invention is highly value added, with wide commercial appeal.

SUMMARY OF THE INVENTION

It is an object of the invention to provide a unitary meat product comprising substantially all the meat of a single poultry carcass in a single integral butchered cut that is separated from the rib and breast bones of the poultry carcass. Another object of the invention is to provide a unitary meat product wherein at least one wing bone, one thigh bone or one leg bone of the poultry carcass is separated from the unitary meat product.

Another object of the invention is to provide a method of making a unitary meat product comprising separating the meat of a poultry carcass from the rib and breast bones of the carcass, wherein substantially all the meat of the poultry carcass forms a single integral butchered cut. Still another object of the invention is to provide a method of making a unitary meat product comprising separating at least one wing bone, thigh bone or leg bone of the poultry carcass from the integral butchered cut.

Another object of the invention is to provide a semi-boneless poultry product comprising substantially all the meat of a single poultry carcass in a single integral butchered cut that is separated from the rib and breast bones of the poultry carcass.

Still another object of the invention is to provide a semi-boneless poultry product having an integral butchered cut that is stitched to seal substantially the same meat facing the interior of a fully-boned poultry carcass to face the interior of the semi-boneless poultry product. Yet another object of the invention is to provide a semi-boneless poultry product wherein the integral butchered cut contained therein is trussed, wrapped or netted. Yet still another object of the invention is to provide a semi-boneless poultry product wherein the integral butchered cut is cooked, marinated, seasoned, flavored, or chemically treated.

Another object of the invention is to provide a method of making a semi-boneless poultry product comprising separating the meat of a poultry carcass from the rib and breast bones of the carcass, wherein substantially all the meat of the poultry carcass forms an integral butchered cut and stitching the integral butchered cut to seal the meat originally facing the interior of a fully-boned poultry carcass to face the interior and forming a semi-boneless poultry product, Yet still another object of the invention is to provide a method of preparing a semi-boneless poultry product by, alone or in any combination doing the following steps: trussing, wrapping or netting the semi-boneless poultry product; treating the semi-boneless poultry product with marinade, seasoning, flavoring, or other chemical; preserving the semi-boneless poultry product by treatment with radiation or freezing; cooking the semi-boneless poultry product; and/or carving or serving the semi-boneless poultry product. Another object of the invention is a semi-boneless poultry product prepared according to any method or combination of methods disclosed herein.

Finally, another object of the invention is a semi-boneless half-carcass poultry product and methods of fabrication of a semi-boneless half-carcass poultry product.

BRIEF DESCRIPTION OF THE DRAWINGS

The foregoing summary, as well as the following detailed description, will be better understood when read in conjunction with the appended drawings. For purposes of illustrating the invention, there is shown in the drawings embodiments which are presently preferred, it being understood, however, that this invention is not limited to the precise arrangements shown. In the drawings.

DETAILED DESCRIPTION OF THE INVENTION

While this invention is satisfied by embodiments in many different forms, there will herein be described in detail preferred embodiments of the invention, with the understanding that the present disclosure is to be considered as exemplary of the principles of the invention and is not intended to limit the invention to the embodiments illustrated and described. Numerous variations may be made by persons skilled in the art without departure from the spirit of the invention.

The method of making the semi-boneless poultry product includes separation of most of the bone structure from the poultry carcass with the optional exceptions of select bones, such as the drumstick bone and knee cap (i.e., the tibia/tarsus and patella). Most or all of the meat normally provided by a fully bone-in product, with the optional exception of, for instance, the wing portion meat, remains to form the poultry product according to the invention.

In one embodiment, this process is generally described for preparing roasting or broiler chickens, but can be applied to any other form of poultry including, but not limited to, turkey, duck, goose, cornish hen, squab, and quail. Other embodiments according to the invention include the methods and products produced therefrom as practiced with any form of domestic animal or wild game wherein the carcass can be roasted or broiled as a whole.

The fabrication method consists generally of three separate stages, that can be considered as separate embodiments with distinct products. The three stages are generally referred to as the Deboning stage, the Sewing and Trussing or Netting stage and the Marinating and Cooking stage. In the alternative, these stages can be combined together to form one embodiment. Within each stage are separate steps that may be optionally implemented in any alternative sequence set according to the needs of the end user. The final product after the deboning and the trussing or netting stages appears similar to a whole poultry carcass for roasting, but is rounded and globular except for the optionally remaining bones in the leg portion. This allows for an aesthetically pleasing product that is more easily prepared and simpler to serve. The stages will now be described in detail with reference to the figures.

Deboning Stage

Figure 1:
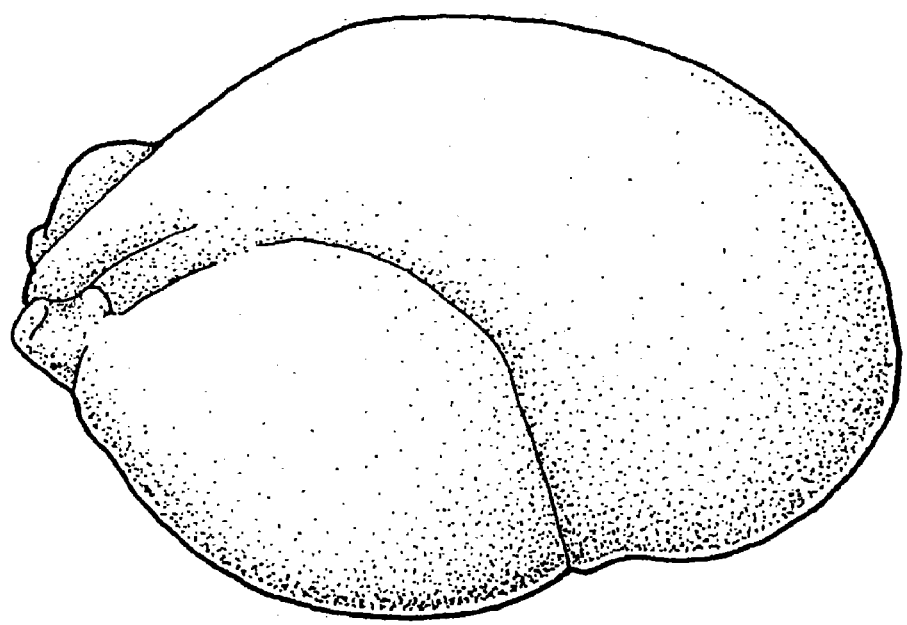
FIG. 1 is a perspective view of the semi-boneless poultry product of the invention prepared for cooking.
Figure 2:
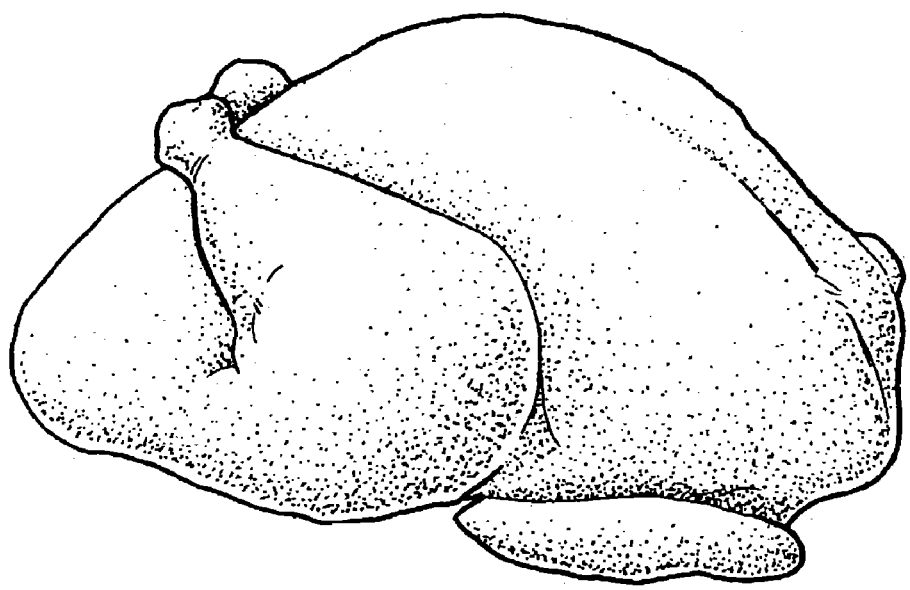
FIG. 2 is a perspective view of a fully bone-in roaster according to the prior art.
Figure 3:
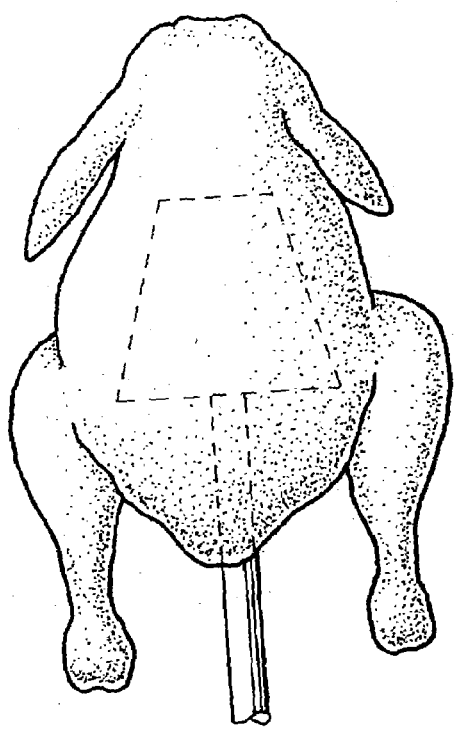
FIG. 3 is side view of a fully boned poultry carcass situated on a cone-shaped mount prior to beginning the deboning process.

The poultry carcass is preferably stabilized for deboning by placement on a mount. However, the invention may also be practiced wherein the poultry carcass is lain on a flat surface or held in place by the user. The poultry carcass may also be held with shackles as is commonly practiced in the poultry product industry. FIG. 3 demonstrates placement of a poultry carcass on a cone-shaped mount. The cone is situated inside the bird through the abdominal cavity of the carcass. The poultry carcass thus placed on a mount, such as a cone through the abdominal opening, is held in a vertical position with the cone resting in the thoracic cavity. The carcass situated this way provides optimal access for many of the steps involved in the de-boning stage.

Figure 4:
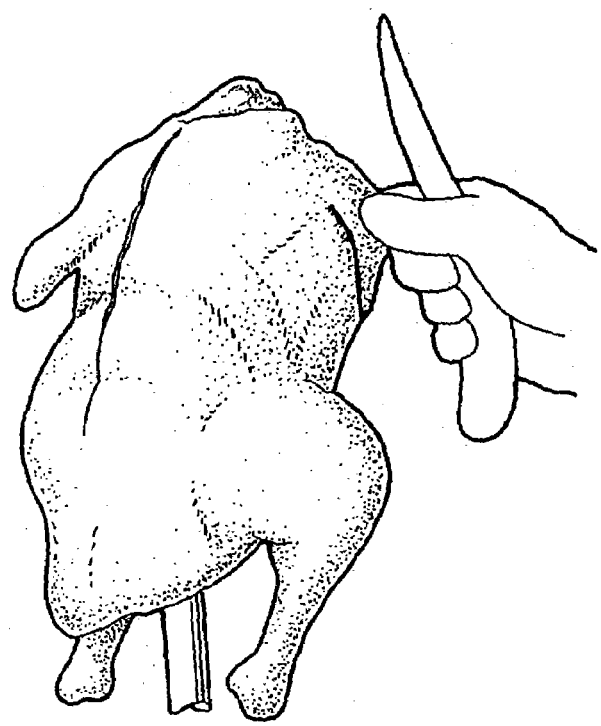
FIG. 4 is a perspective view of the initial access incision along the back of a poultry carcass to gain access to the carcass interior for de-boning.

Access to the interior of the poultry carcass for separation is gained by creating an initial access incision as shown in FIG. 4. In this figure the initial access incision is made along the spine of the back of the carcass, but can also be done at other sites. It is preferable to minimize the size of the initial access incision as this will need to be sewn closed at a later stage in preparing the semi-boneless poultry product carcass for presentation.

Figure 5:
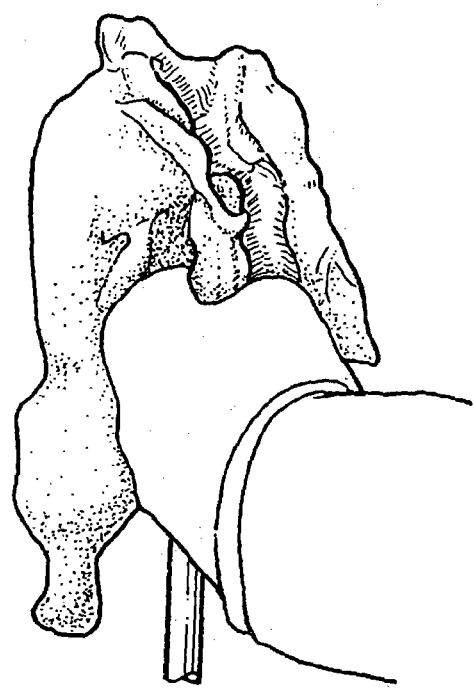
FIG. 5 is a perspective view of the initial deboning step as it is begun through the initial access incision along the back of the poultry carcass.
Figure 6:
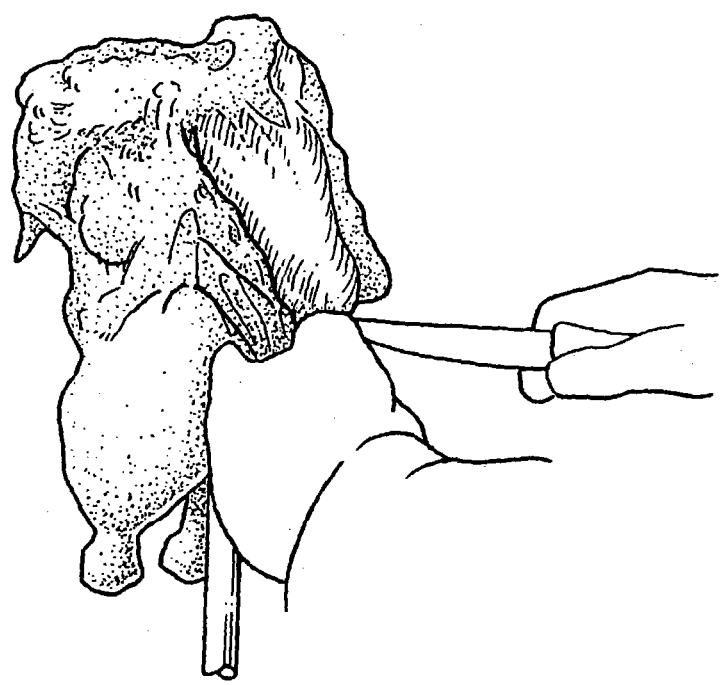
FIG. 6 is a perspective view of the deboning process as the meat of the carcass separated from the first side and entirely off the back on that side of the poultry carcass.

Once the initial access incision is in place, cuts for separating the meat from the bones are made through the opening provided by the initial access incision. FIG. 5 shows cuts to the meat made along the back of the carcass from base of neck to the tail, incising all skin and fat connecting them to the bone structure. The meat is folded outward from the spinal column as it is cut. All skin, fat and muscle tissue is filleted to the side maintaining the skin intact other than the initial access incision. Cuts are continued outward along the bone structure as shown in FIG. 6 to fillet the skin and meat from the back to the sides. The meat is continually separated as one integral meat portion from the original carcass structure.

Figure 7:
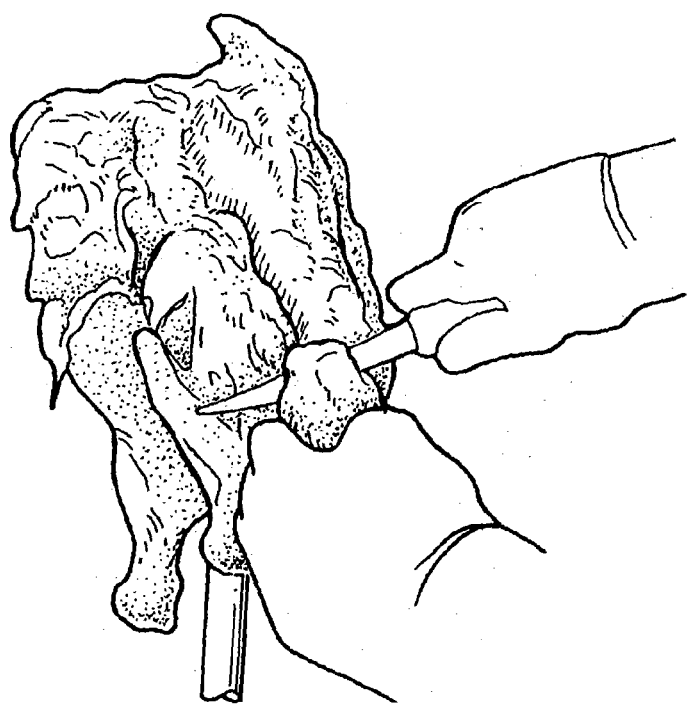
FIG. 7 is a perspective view of a wing bone as it is cut from the meat after it has been separated from one side of a poultry carcass.

In one embodiment according to invention, the first wing joint and tip may be removed from the integral meat portion. This wing joint and tip removal stage can be accomplished at any point throughout the deboning stage. Wing joint and tip removal is demonstrated in FIG. 7 as it can occur partially through the deboning stage.

The wing joint on either side can be severed by cutting through the articular cartilages and tendons (i.e., removal of the radius/ulna from the humerus). After the attached first wing joint and tip is removed by severing the wing joint through the articular cartilages and tendons the process can be repeated for the remaining side. After the wing tips are removed from either side of the carcass, then the wing bones attached to the body of the carcass can also be removed by pushing the neck/breast skin to the front of carcass to expose the scapular/humerus articular joint. An incision is then made through the joint and along the scapula to continue filleting meat and skin to the side. A cut is made along the diaphysis of the humerus to expose the bone. Additional cuts are made on each side and the humerus is then removed. This process can be repeated for both sides of the carcass.

Figure 8:
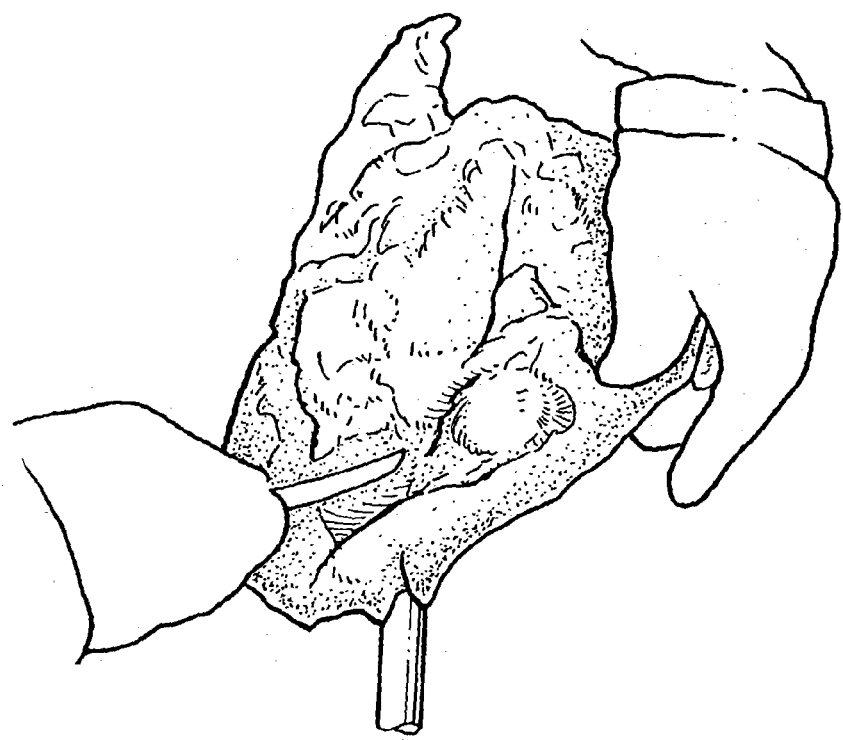
FIG. 8 is a perspective view of the poultry carcass meat as it is initially separated off the back on the second side of the poultry carcass.
Figure 9:
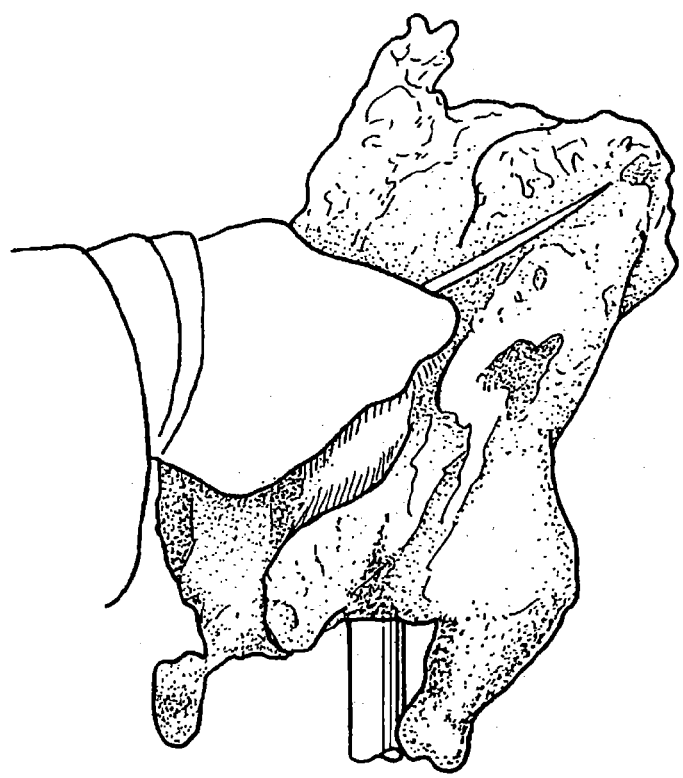
FIG. 9 is a perspective view of the poultry carcass as meat is separated from the upper back on the second side of the poultry carcass.
Figure 10:
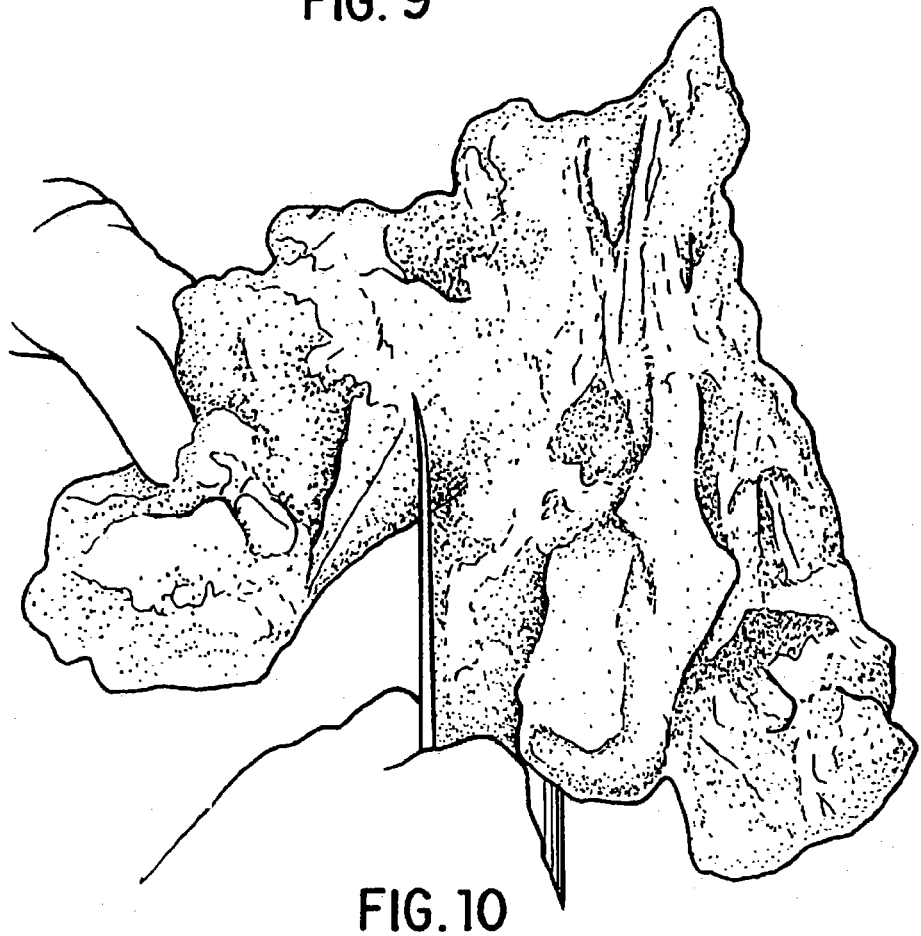
FIG. 10 is a perspective view of meat separation through the gluteus muscle region after all meat has been separated from both sides of the back of the poultry carcass.
Figure 11:
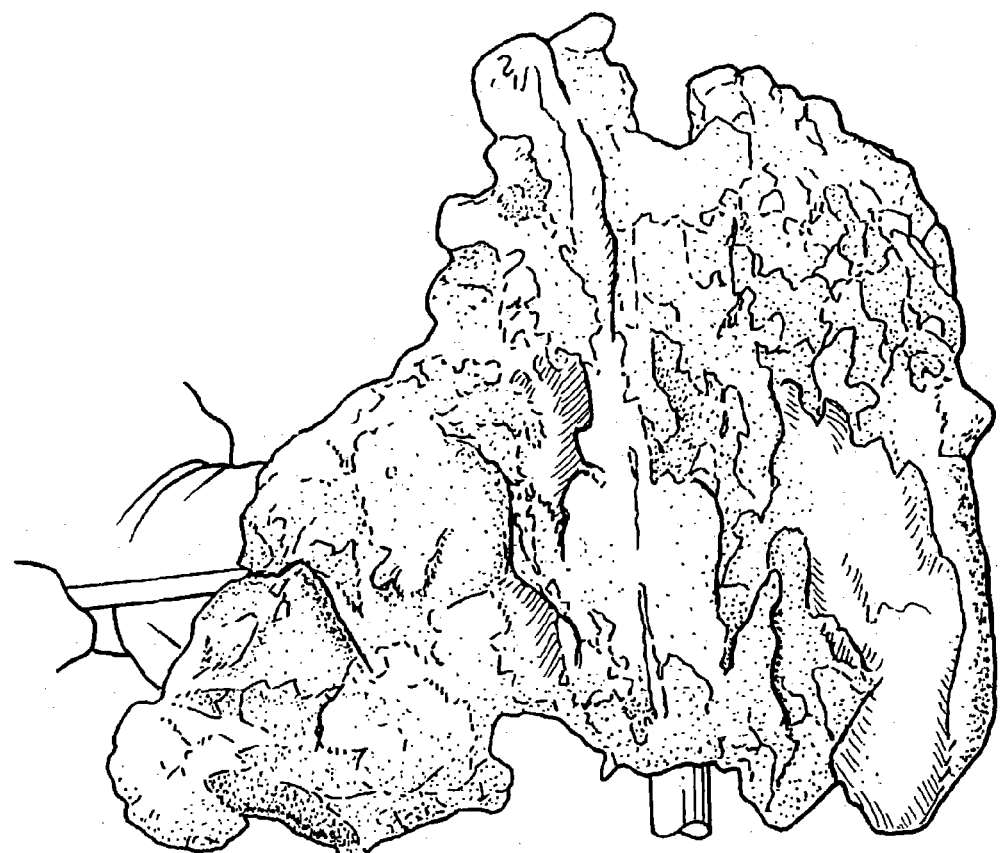
FIG. 11 is a perspective view of the thigh bones being separated from the meat and leaving the leg bones with the other meat after it has been separated off the back of the poultry carcass.
Figure 12:
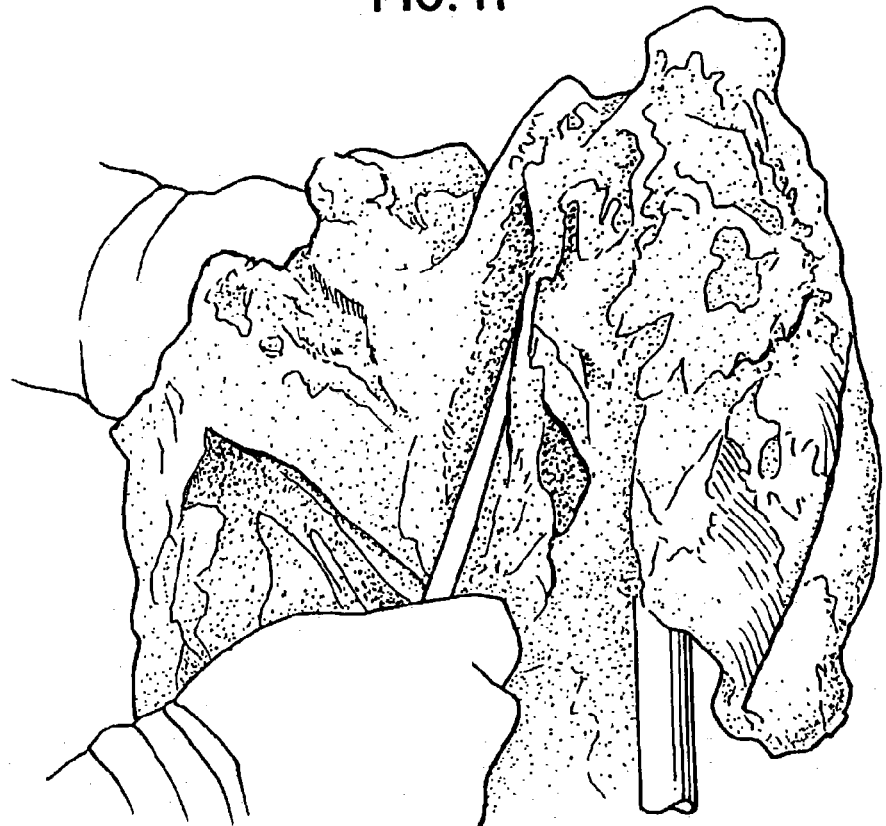
FIG. 12 is a perspective view of the deboning process as meat is separated from around the breast bone on one side of the poultry carcass.

Another optional step in the deboning stage relates to removal of the thigh bones as shown in FIG. 8. Removal of the thigh bones is most easily accomplished as part of the deboning stage after the meat and skin is filleted along the back. Gluteus muscle is carefully loosened by sliding a knife tip along the backbone and exposing the hip joint. Removal can be accomplished by grasping the hock of the leg, twisting the whole leg upward and towards the center or keel area of the breast which will pop the hip joint (i.e., displacement of the head of the femur from the pelvic girdle). The knife tip is used to cut and loosen the head of the femur as shown in FIG. 8. The whole leg is then lifted away from the skin towards the back and upward to expose the stifle joint. A knife cut separates the articular joint by severing the cartilage and connective tissue between the drum bone and thigh bone (i.e., displacing the femur from the tibia by severing the femoral-tibial articulation.) A cut can also be made along the diaphysis of the femur to expose the bone. Additional cuts can be made on each side and the femur is then removed. The tibia/tarsus and patella are left as a part of the unitary meat toward forming the desired end-product. This process can then be repeated on the other side of the carcass.

In all these optional removal steps, care should be taken as it is preferable not to incise skin at any step of the process after the initial incision. The final deboning step and the removal of the unitary meat portion from the supporting bones in the carcass are accomplished together in one motion as the separated meat will fall away from the bones on the support mounting. The final deboning steps according to one embodiment of the invention are illustrated in FIG. 9 through FIG. 12 and includes deboning of the breast area.

In deboning the breast area—the breast muscle (i.e., the pectoralis major) is filleted on the first side of the carcass away from the ribs, continuing past the tenderloin (i.e., the pectoralis minor) to the base of the sternum or keel. This step is repeated on the remaining side of the carcass. From the front of the carcass, the breast muscle is loosened from the clavicle by incising on each side of the clavicle. The insertions (i.e., the tendons) of the tenderloins, right and left, are loosened by sliding the knife underneath the clavicle and cutting the tendon and muscle. The entire breast including intact skin is then pulled downward from the sternum towards the keel of the carcass using the knife tip to facilitate a smooth even removal of all meat from the frame of the carcass.

Completing removal of the unitary meat portion is accomplished using a knife to cut through the smooth muscle tissue of the flank abdominal areas and removing the semi-boneless product from the breast/back frame. Note that the breast deboning step, according to this embodiment, is followed by the final separation step in essentially the same motion.

Figure 13:
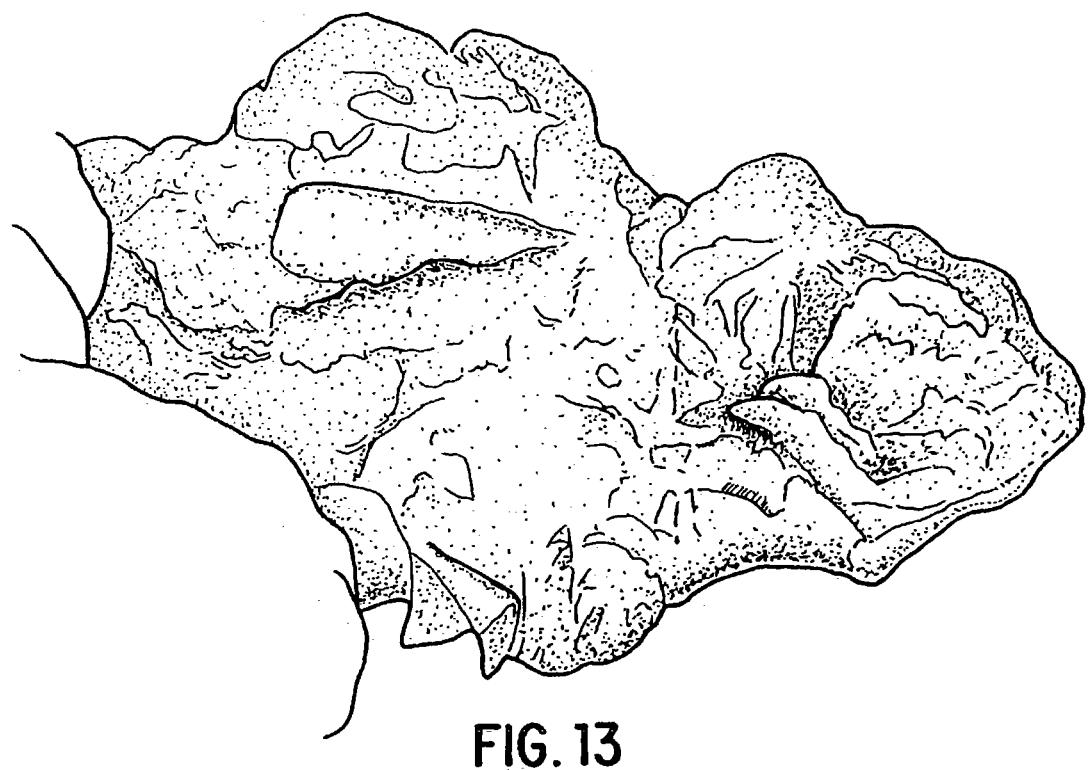
FIG. 13 is a perspective view of the interior meat of the semi-boneless poultry carcass, retaining the leg bones. The meat is laid out for trussing after it has been completely separated from the other bones of the poultry carcass.

The unitary meat portion for forming the semi-boneless product is then inspected for any bone slivers or cartilage pieces. This is most easily accomplished by laying the unitary meat portion onto a flat surface as shown in FIG. 13. The entire meat portion is to be carefully inspected, particularly along the keel cartilage, and any pieces of cartilage that may still be attached are removed.

Sewing and Trussing/Wrapping/Netting Stage

Figure 14:
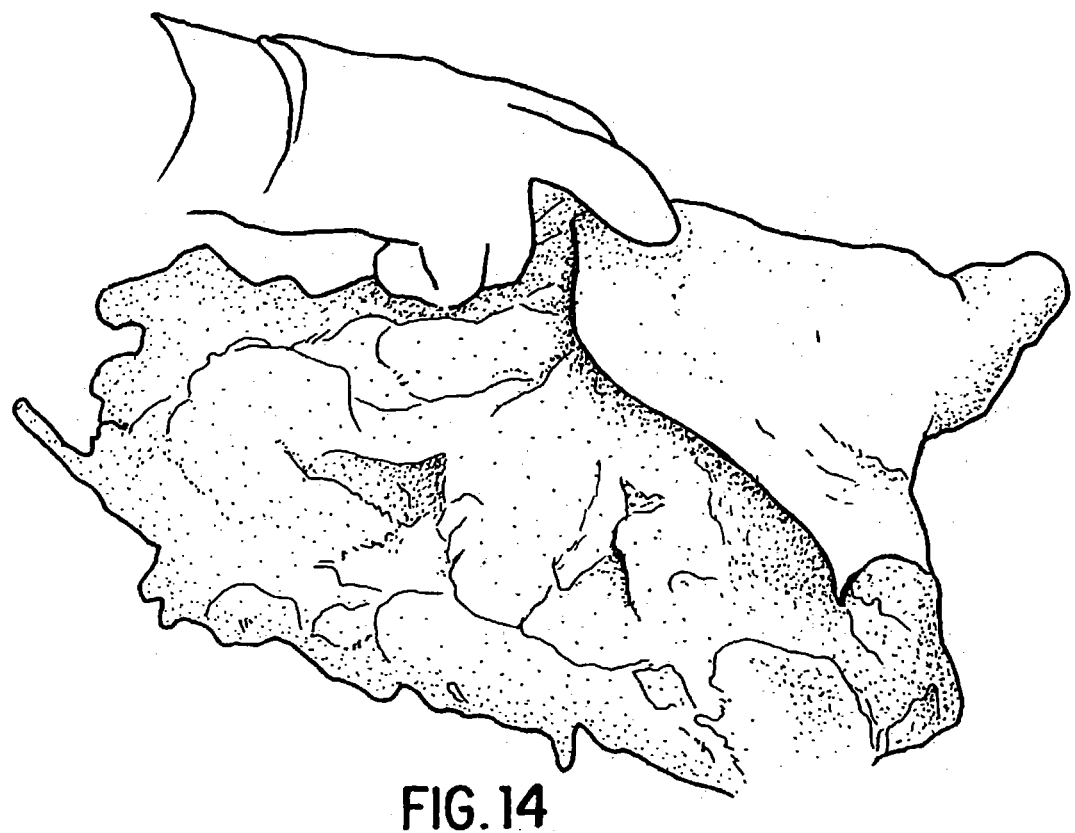
FIG. 14 is a perspective view of the semi-boneless poultry carcass meat as it is initially folded back toward its natural configuration in preparation for the sewing step in the trussing process.
Figure 15:
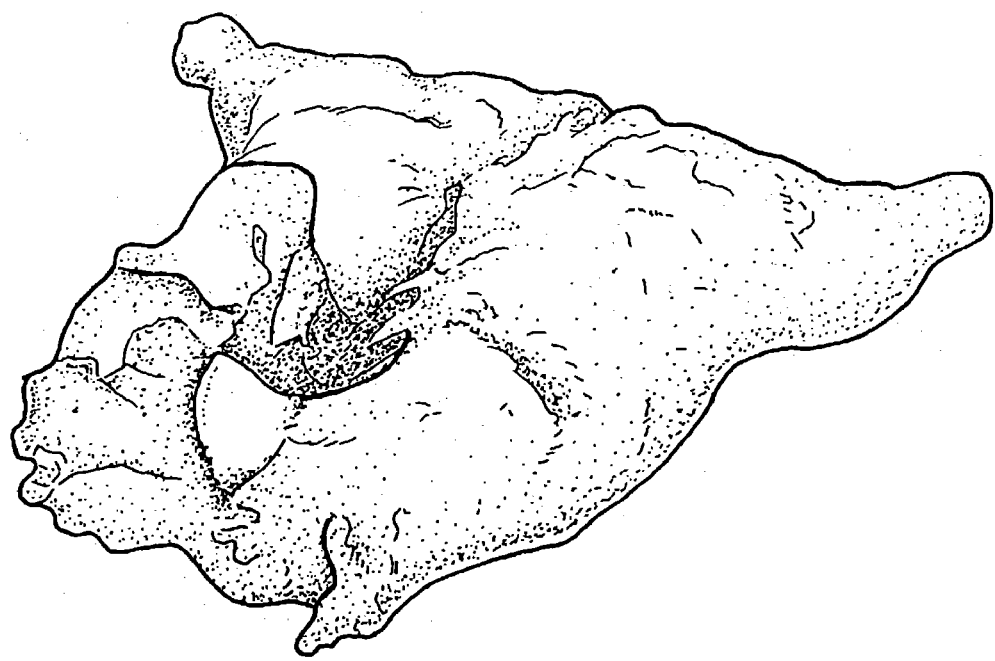
FIG. 15 is a perspective view of the semi-boneless poultry carcass meat after it has been folded entirely back into its natural configuration prior to sewing.
Figure 16:
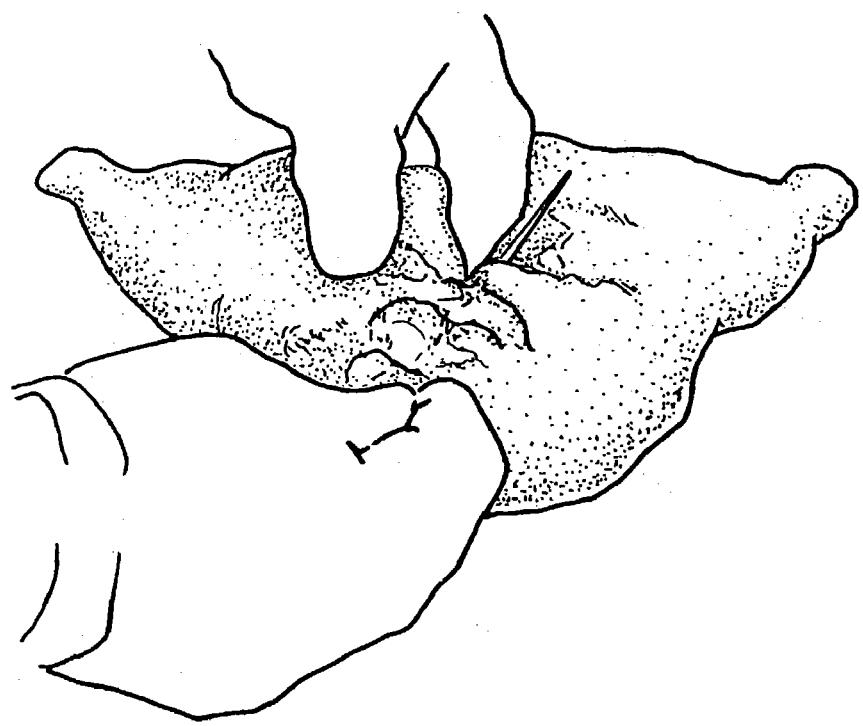
FIG. 16 is a perspective view of the semi-boneless poultry product as it is sewn closed using a skewer passing through the skin/meat proximal to the initial incision that provided access through the skin for the deboning process.
Figure 17:
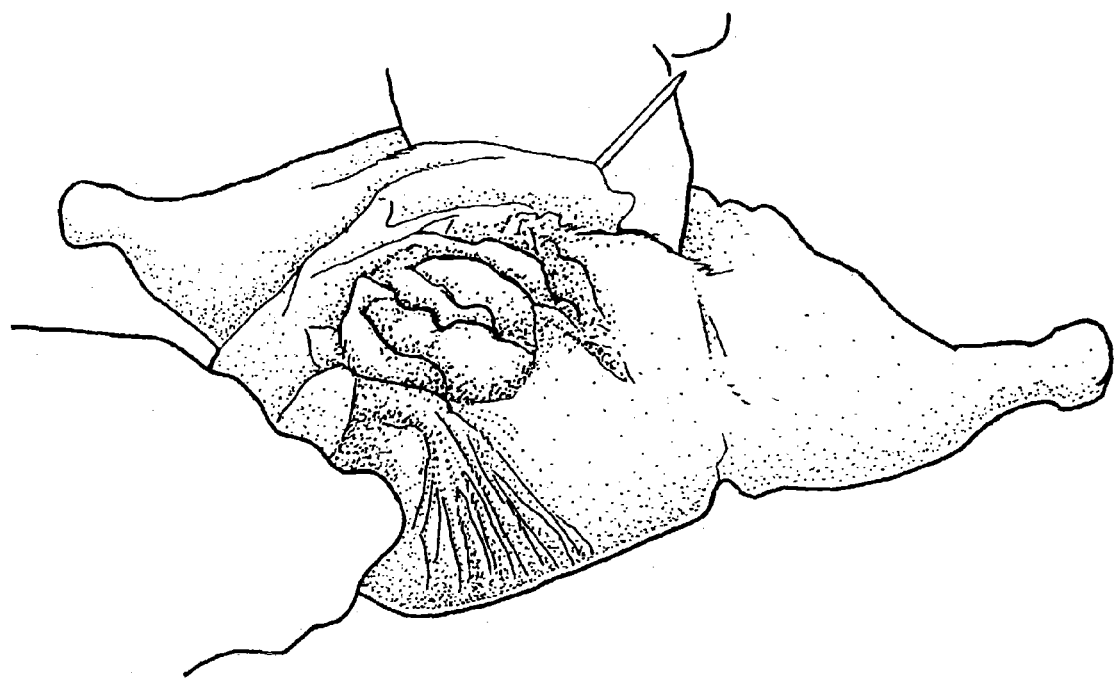
FIG. 17 is a perspective view of the semi-boneless poultry product after sewing with a skewer is completed to close the initial access incision.

Generally, in the Sewing and Trussing or Netting stage, the unitary meat product from the Deboning stage is formed and shaped to resemble a fully boned whole bird roaster. The unitary meat product is placed on a flat surface with the skin or breast side down, as shown in FIG. 14. The skin is then folded and lined up along the back of the carcass following the direction of the initial access incision as it was originally made on the poultry carcass as shown in FIG. 15. Using, for instance, a skewer, the skin is then stitched together following the original cut down the back as demonstrated in FIG. 16.

Although the stitching can be accomplished by numerous methods, one technique is as follows: Starting with the neck skin, the skewer tip is inserted into and out of the skin/meat catching about a half an inch of flesh with each stitch. This process is repeated up or down the entire length of the product in an alternating fashion from, for instance, the right to left side of skin to sew the unitary meat product to resemble the architecture of the original fully boned bird. The process can begin at the neck area, proceeding through the wing area and down the thigh/back area. The sewn product cab then be flipped over onto its other side for trussing.

Figure 18:
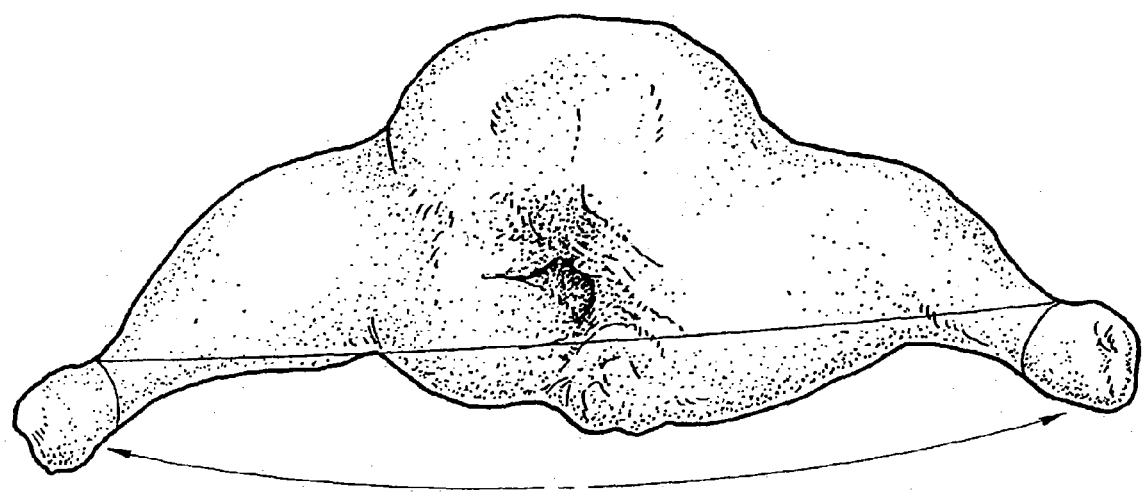
FIG. 18 is a perspective view of the semi-boneless poultry product with leg bones attached together loosely with an elastic band for trussing to configure the semi-boneless poultry product to resemble a fully bone-in roaster.
Figure 19:
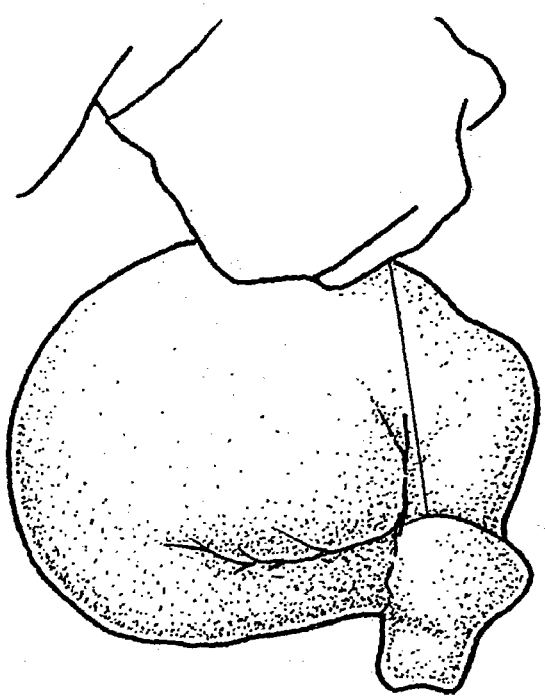
FIG. 19 is a perspective view of the bottom of the semi-boneless poultry product as it is trussed with the elastic band to draw the leg bones together.
Figure 20:
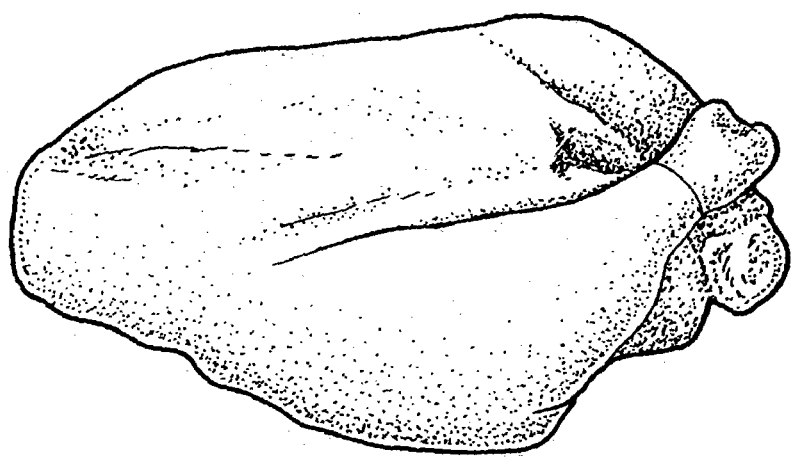
FIG. 20 is perspective view of the semi-boneless-poultry product after the elastic band is secured to the top of skewer at the opposite end from the legs on the semi-boneless poultry product.

Trussing can be accomplished using an elastic cotton trussing band. The hock of one leg is looped to initially attach the band which is then wrapped around the hock of the remaining leg in a circular motion as shown in FIG. 18. The legs are then drawn together and closer to the body of the carcass by drawing the elastic band tightly as shown in FIG. 19. The end of the band is then stretched from the back side of the product following the sewn area of the back and attached to the ring of the skewer to complete the process. As shown in FIG. 20, any skin or fat may optionally be pushed into the abdominal cavity to enhance the aesthetic appeal of the semi-boneless poultry product The tip of the skewer can then be inserted into either of the drumsticks, to prevent the tip from puncturing the packaging material.

Figure 21:
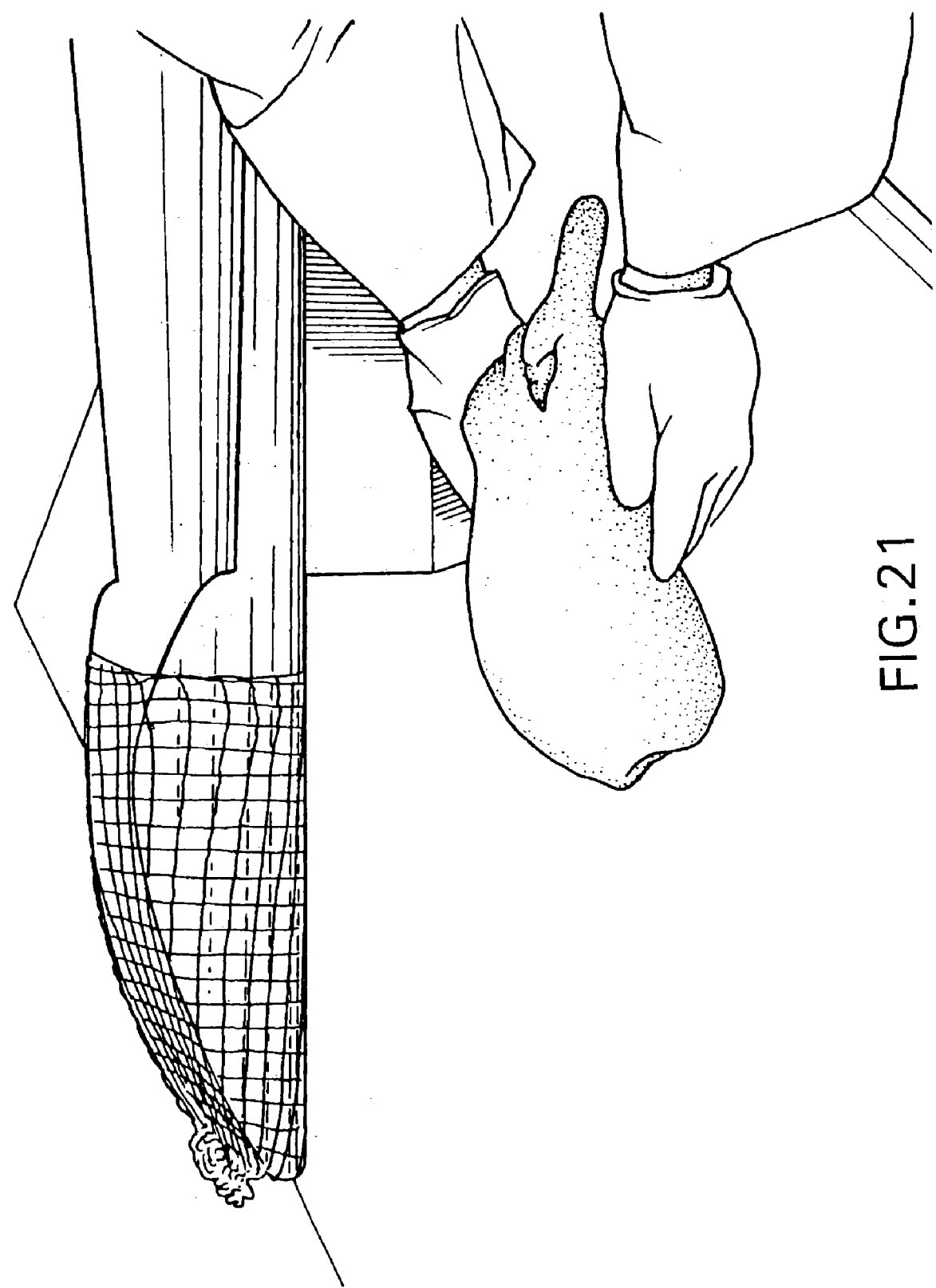
FIG. 21 is perspective view of an alternative embodiment of a method of making the semi-boneless poultry product wherein the unitary meat product is loaded onto chute for placing netting to form the unitary meat product into the shape of a fully bone-in roaster.
Figure 22:
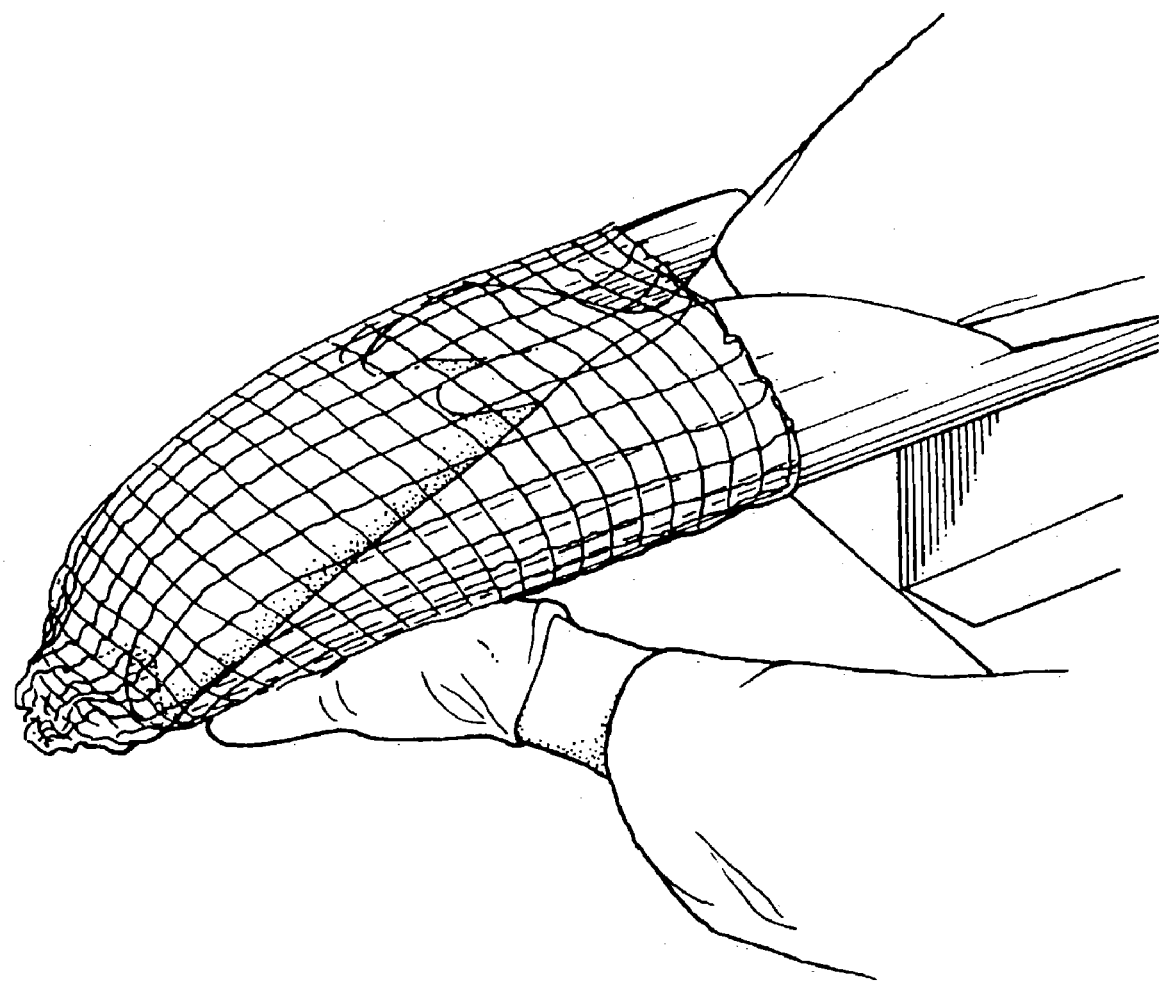
FIG. 22 is perspective view of an alternative embodiment of a method of making the semi-boneless poultry product wherein the unitary meat product is moved from the chute and into the netting to form the unitary meat product into the shape of a fully bone-in roaster.
Figure 23:
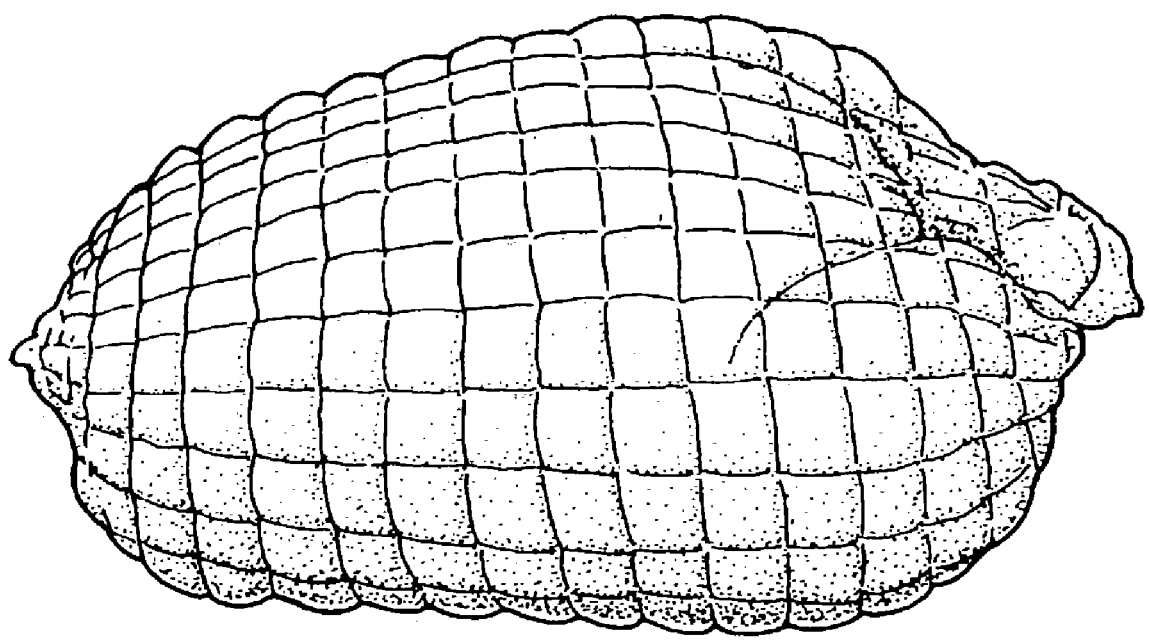
FIG. 23 is perspective view of an alternative embodiment of the semi-boneless poultry product wherein netting forms the unitary meat product into the shape of a fully bone-in roaster.

The unitary meat product from the deboning stage may also be formed and shaped to resemble a fully boned whole bird by placing the unitary meat product into a netting, preferably an elastic netting as shown in FIGS. 21 to 23. Following, for example, the process demonstrated in FIG. 21, the semi-boneless unitary meat product is rolled and placed onto the chute of a netting horn with netting placed to capture the unitary meat product once pushed into place. The unitary meat product is rolled into shape and pushed along the horn and into the netting as shown in FIG. 22. The legs are tucked into a folded position and netting is secured around the hock. The semi-boneless meat product as shown in FIG. 23, may now be packaged for storage, transportation or sale. The semi-boneless meat product may also be wrapped.

Marinating and Cooking Stage

The product fabricated thus far can be further processed using a variety of methods. The semi-boneless poultry product can be treated to enhance the appearance, or to preserve the meat product for storage. For instance, the meat product can be treated with radiation or frozen. Further processing can also include such steps as marination of the product by injection or by vacuum tumbling using various levels of marinade. This can be accomplished using solutions commonly used in marinades such as salt, sodium phosphates, lemon juice, brown sugar, starches, sodium lactates, and carrageenans. The product may be marinated, seasoned, flavored, or chemically treated for any reason useful in the industry for enhancing or preserving the product.

Other methods of further processing can include cooking such as oven roasting or curing and smoking. Fully cooked products can be subjected to several methods of surface treatment such as addition of caramel color, impingement browning, seasoning rubs, and hot oil browning. The cooked product can be prepared from either fresh or frozen semi-boneless poultry.

Semi-Boneless Half-Carcass Poultry Product

As an alternative embodiment, the invention also embraces semi-boneless poultry carcass halves or other parts. According to one method, a semi-boneless poultry half carcass may be produced by severing a full-size semi-boneless poultry carcass directly in half, typically through the breast meat, to obtain two poultry half carcasses.

According to another embodiment, a semi-boneless poultry half carcass may be made directly from the fully boned carcass. In this fabrication method, the poultry carcass can be held in place with a cone deboning device after placing the poultry carcass on the cone through the thoracic cavity. A fillet of the pectoralis major and pectoralis minor is made following the keel/sternum by slicing through the skin along the front of the breast after the anterior tip of the sternum or keel, filleting the pectoralis major and pectoralis minor from the one side of the bird, and continuing the cut along the sternum and filleting all the meat along the rib cage toward the back of the carcass.

At the top of the carcass, the meat is filleted away from the clavice (i.e., the wishbone) to the base of the scapular/humerous joint. The joint is severed through the connective tissue, tendon and cartilage to keep the wing connected to the deboned breast meat section. This cut continues along the scapula leaving the clavical/scapula attached to the rib-cage/neck area. All meat, skin, and attached wing are intact with the product. At the bottom of the carcass, all meat continues to be filleted through the flank area until the hip joint is popped and the head of the femur is loosened at the joint. Either or both the femur (thigh bone) or tibia (drum bone) may be left in the product. The final cuts are to filet the remaining flesh, including the gluteus and the skin, from the back of the carcass in order to complete the first of the two halves in a semi-boneless poultry half. The process may then be repeated with the other half of the bird to produce two complete semi-boneless poultry half-carcasses.

The present invention having now been fully described with reference to representative embodiments and details, it will be apparent to one of ordinary skill in the art that changes and modifications can be made thereto without departing from the spirit or scope of the invention as set forth herein.

What is claimed is:

1. A semi-boneless chicken product comprising substantially all the meat of a single chicken carcass in an integral butchered cut that is separated from the rib and breast bones of the chicken carcass, wherein at least one of a wing bone, a thigh bone, or a leg bone is attached to the integral butchered cut.

2. The semi-boneless chicken product according to claim 1, wherein the integral butchered cut is stitched to seal substantially the same meat facing the interior of a fully-boned chicken carcass to face the interior of the semi-boneless chicken product.

3. The semi-boneless chicken product according to claim 1, wherein the integral butchered cut is trussed, wrapped or netted.

4. The semi-boneless chicken product according to claim 2, wherein the integral butchered cut is trussed, wrapped or netted.

5. The semi-boneless chicken product according to claim 1, wherein the integral butchered cut is cooked, marinated, seasoned, flavored, chemically treated, frozen or irradiated.

6. The semi-boneless chicken product according to claim 1 wherein the at least one of the wing bone, the thigh bone, or the leg bone attached to the integral butchered cut consists of at least one leg bone.

7. The semi-boneless chicken product according to claim 6, wherein the integral butchered cut is trussed, wrapped or netted.

8. The semi-boneless chicken product according to claim 6, wherein the integral butchered cut is wrapped.

9. The semi-boneless chicken product according to claim 6, wherein the integral butchered cut is netted.

10. The semi-boneless chicken product according to claim 1, wherein the integral butchered cut is wrapped.

11. The semi-boneless chicken product according to claim 1, wherein the integral butchered cut is netted.

* * * * *